A. H. LENT.
PIVOT LIGHT.
APPLICATION FILED JULY 16, 1909.

967,206.

Patented Aug. 16, 1910.

Witnesses
J. D. McLaughlin
H. J. VanDyke

Inventor
Alfred H. Lent
By E. E. Vrooman
Attorney

UNITED STATES PATENT OFFICE.

ALFRED H. LENT, OF OAKLAND, CALIFORNIA.

PIVOT-LIGHT.

967,206.  Specification of Letters Patent.  Patented Aug. 16, 1910.

Application filed July 16, 1909.  Serial No. 508,002.

*To all whom it may concern:*

Be it known that I, ALFRED H. LENT, citizen of the United States, residing at Oakland, in the county of Alameda and State of California, have invented certain new and useful Improvements in Pivot-Lights, of which the following is a specification.

This invention relates to headlight operating mechanism for motor vehicles in which the supports for the headlight are connected with the steering gear so that said supports will turn with said gear to cause the lights to project their rays in the direction of travel of the vehicle.

The principal object of the invention is to provide an endless connection which has a direct connection with each headlight support and the steering gear so that the usual connecting rods may be dispensed with.

In carrying out the objects of the invention generally stated above, it will, of course, be understood that the essential features thereof are necessarily susceptible of changes in details and structural arrangements, one preferred and practical embodiment of which is shown in the accompanying drawings wherein—

Figure 1:
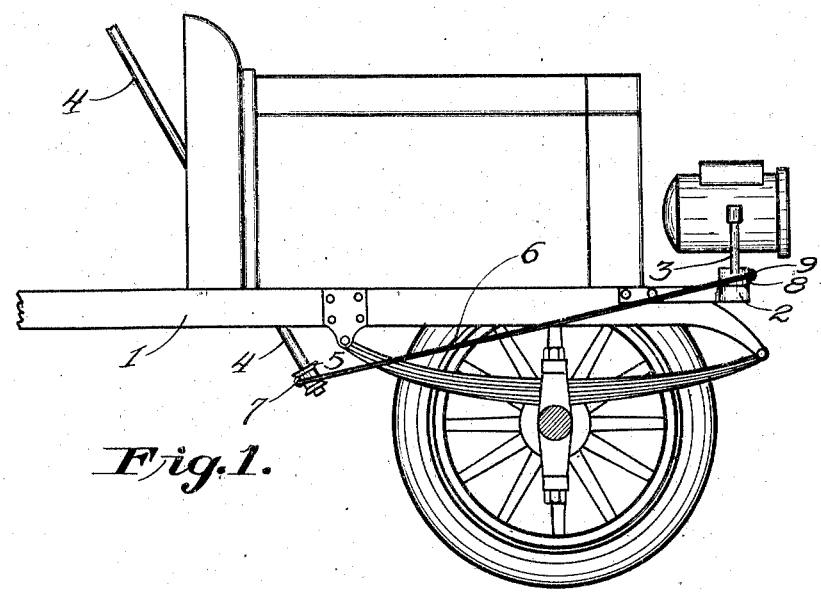
Figure 2:
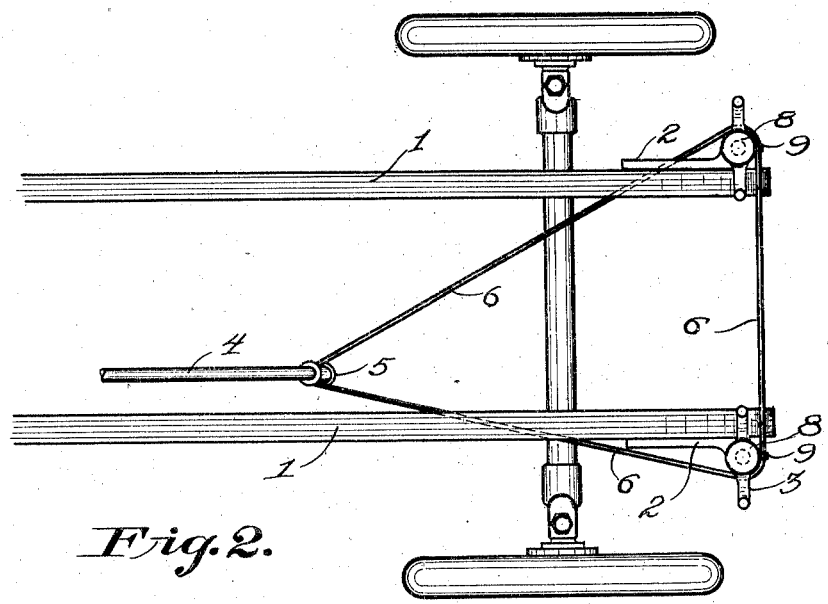

Figure 1 is a view in side elevation of the front portion of a motor vehicle, one wheel thereof being removed to show the improved mechanism. Fig. 2 is a top plan view, the hood being removed.

Referring to said drawings by numerals, 1 designates the spaced-apart longitudinally-arranged side bearings of a motor vehicle frame, the forward end of each carrying on their outer face a lamp bracket 2 in which the lamp forks 3 are pivotally mounted.

The steering shaft 4 of the vehicle projects through the bottom thereof and carries a spool 5 at its inner end. An endless connection 6, such as a belt, cable or the like, has one portion looped over said spool 5 and fastened thereon by means of the staple 7 or other fastener. Said connector projects forwardly and upwardly and is locked around the bases 8 of the lamp forks 3 and held in such position by means of the staples 9.

It will be seen from the foregoing that the connector 6 is held from contact with the beams 1 by reason of the fact that the lamp brackets 2 are of the usual outwardly projecting type which hold the forks 3 away from and above said beams, consequently the said connector is held away from the sides of said beams and also above their tops so that there is no danger of contact therewith, such as would damage the connector or disfigure the beams. Obviously by turning the shaft 4 a pull will be exerted upon the connector which is immediately imparted to the forks to cause the same to turn with said shaft.

What I claim as my invention is:—

In a motor vehicle, the combination with the spaced-apart side beams of the frame thereof, a lamp fork pivotally mounted on each beam, a steering shaft carried by the vehicle and projecting below the bottom thereof, a spool fast on the lower end of said shaft, an endless connector looped over said spool and said forks, and fasteners for attaching said connector to the spool and forks.

In testimony whereof I affix my signature in presence of two witnesses.

ALFRED H. LENT.

Witnesses:
H. C. SCHROEDER,
J. D. McLAUGHLIN.